US007230235B2

(12) United States Patent
Goldberg et al.

(10) Patent No.: US 7,230,235 B2
(45) Date of Patent: Jun. 12, 2007

(54) AUTOMATIC DETECTION OF QUALITY SPECTRA

(75) Inventors: David Goldberg, Palo Alto, CA (US); Marshall W. Bern, San Carlos, CA (US); John R. Yates, III, San Diego, CA (US)

(73) Assignees: Palo Alto Research Center Incorporated, Palo Alto, CA (US); The Scripps Research Institute, La Jolla, CA (US)

( * ) Notice: Subject to any disclaimer, the term of this patent is extended or adjusted under 35 U.S.C. 154(b) by 0 days.

(21) Appl. No.: 11/122,364

(22) Filed: May 5, 2005

(65) Prior Publication Data

US 2006/0249667 A1 Nov. 9, 2006

(51) Int. Cl.
*G01N 23/00* (2006.01)
*B01D 59/44* (2006.01)
*H01J 49/26* (2006.01)

(52) U.S. Cl. ................. 250/288; 250/281; 250/282; 436/86; 436/173

(58) Field of Classification Search ............... None
See application file for complete search history.

(56) References Cited

U.S. PATENT DOCUMENTS 5,538,897 A  7/1996  Yates, III et al.
6,017,693 A * 1/2000  Yates et al. .............. 435/5
6,489,121 B1  12/2002  Skilling
6,770,871 B1  8/2004  Wang et al.
6,799,121 B2  9/2004  Chu et al.
6,846,679 B1  1/2005  Schmidt et al.

OTHER PUBLICATIONS

Automatic Quality Assessment of Peptide Tandem Mass Spectra published in Bioinfomatics, vol. 20, Supp. 1, 2004, pp. i49-i54 (DOI:10.1093/bioinformatics/bth947), published date Jul. 31-Aug. 4, 2004.
Code Developments to Improve the Efficiency of Automated MS/MS Spectra Interpretation, Journal of Proteome Research 2002, 1, pp. 211-215, published on Web Mar. 6, 2002.
Proteome Research: Mass Spectrometry, Peter James, ISBN 3-540-67256-7 Springer-Verlag Berlin Heidelberg New York (7 Protein Identification by SEQUEST, David L. Tabb, Jimmy K. Eng, and John R. Yates III) (5 pages).
An Approach to Correlate Tandem Mass Spectral Data of Peptides with Amino Acid Sequences in a Protein Database, J Am Soc Mass Spectrom 1994, 5, Jimmy K. Eng, Ashley L. McCormack, and John R. Yates, III, pp. 976-989.

(Continued)

*Primary Examiner*—Nikita Wells
(74) *Attorney, Agent, or Firm*—Fay, Sharpe, Fagan, Minnich & McKee, LLP

(57) ABSTRACT

The present application provides systems and/or methods for accessing a portion of a mass-fragment spectrum, constructing a vector that is responsive to an intensity-balance of the spectrum, and selecting the spectrum responsive to the vector.

41 Claims, 8 Drawing Sheets

OTHER PUBLICATIONS

Intensity-Based Statistical Scorer for Tandem Mass Spectrometry, Analytical Chemistry, vol. 75, No. 3, Feb. 1, 2003, Moshe Havilio, Yariv Haddad, and Zeev Smilansky, pp. 435-444.

Making Large-Scale SVM Learning Practical, Thorsten Joachims, Support Vector Learning, Bernhard Scholkopf, Christopher J. C. Burges, and Alexander J. Smola (eds.), MIT Press, Cambridge, USA, 1998, pp. 41-56.

7 Protein Identification by Sequest, Proteome Research: Mass Spectrometry, Peter James, ISBN 3-540-67256-7,Springer-Verlag Berlin Heidelberg New York, David L. Tabb, Jimmy K. Eng, and John R. Yates III, pp. 125-142.

Bern, M., et al., "Automatic Quality Assessment of Peptide Tandem Mass Spectra", *Bioinformatics,* Oxford University Press, 2004, vol. 20, Suppl. 1, pp. i49-i54, XP007901066, ISSN: 1367-4803.

Prados, J., et al., "Mining Mass Spectra for Diagnosis and Biomaker Discovery of Cerebral Accidents", *Proteomics,* 2004 Wiley-VCH Verlag Gmbh & Co. KGaA, Weinhelm, vol. 4, No. 8, pp. 2320-2332, XP008039497, ISSN: 1615-9853.

European Search Report, Ep06009373.9-1224, Search completed Sep. 13, 2006, Examiner Anton Versluis, The Hague.

\* cited by examiner

AUTOMATIC DETECTION OF QUALITY SPECTRA

STATEMENT REGARDING FEDERALLY SPONSORED RESEARCH OR DEVELOPMENT

This invention was made with United States Government support under Agreement No. RR11823 awarded by the National Institute of Standards and Technology (NIST). The United States Government has certain rights in the invention.

CROSS REFERENCE TO RELATED PATENTS AND APPLICATIONS

This application is related to co-pending U.S. patent application Ser. No. 11/122,643 filed on May 5, 2005 and entitled "AUTOMATIC DETECTION OF QUALITY SPECTRA."

BACKGROUND

The present application is directed to polymers consisting of monomers having masses drawn from a limited pool. Examples are peptides where the monomers are a limited set of amino acids (typically about 20), or glycans where the monomers are a small set of monosaccharides (typically about 5). More particularly, the application is directed to the automated quality assessment of mass-fragment spectra generated from such molecules. Details of the automated quality assessment are discussed with a focus on peptide spectra generated through the use of tandem mass spectrometers (MS/MS). However, it is to be appreciated other techniques can also be utilized to obtain substantially similar results. Furthermore, it is to be understood that while the following discussion makes reference to peptide analysis, the concepts of the present application are applicable to other polymers. Furthermore, concepts of the present application can be applied to other molecules that can form fragmentation spectra.

By way of example, the peptide (which might be obtained from a chromatography device) is applied to a first mass spectrometer, which serves to select, from a mixture of peptides, a target peptide of a particular mass. The target peptide is fragmented to produce a mixture of the "target" or parent peptide and various component fragments, typically peptides of smaller mass. This mixture is transmitted to a second mass spectrometer that records a mass-fragment spectrum. In some instances, the mixture is recycled back through the same and/or similar mass spectrometers for one or more subsequent mass spectrometry operations. This mass-fragment spectrum will typically be expressed in the form of a histogram having a plurality of peaks, each peak indicating the mass-to-change ratio (m/z) of a detected fragment and having an intensity value.

It is often desired to use the mass-fragment spectrum to identify the material (e.g., peptide or glycan) that resulted in the fragment mixture. Previous approaches have typically involved using the mass-fragment spectrum as a basis for hypothesizing one or more candidate amino acid sequences. This procedure has typically involved human analysis by a skilled researcher, which is both time and labor intensive. Therefore, automated procedures have been developed, such as that described in U.S. Pat. No. 6,017,693, "Identification of Nucleoticles, Amino Acids, or Carbohydrates by Mass Spectrometry," Yates, III, et al., and U.S. Pat. No. 5,538,897, "Use of Mass Spectrometry Fragmentation Patterns of Peptides to Identify Amino Acid Sequences in Databases." Both patents are hereby incorporated in their entirety by reference.

These patents describe the use of high-performance liquid chromatography (HPLC) coupled with tandem mass spectrometry (MS/MS) and database-search software, such as SEQUEST, to identify unknown test materials. Such a design, however, produces a large number of spectra, many of which are of too poor quality to be useful. Therefore, it has been suggested by Tabb, D. L., et. al. ("Protein Identification by SEQUEST." In P. James, (ed.) (2001), *Proteome Research: Mass Spectrometry*, Springer, Berlin.), hereby incorporated by reference in its entirety, to employ a filter to eliminate poor spectra prior to the database search to improve throughput and robustness. More particularly, Tabb, D. L. et al. discusses spectral quality assessment, and mentions certain rules for prefiltering, such as minimum and maximum thresholds on the number of peaks and a minimum threshold on total peak intensity. The article specifically states that such rules can remove 40% or more of the bad spectra.

It is considered to be advantageous to provide an improved filter to limit the number of spectra needed to be compared in an automated proteomics process.

BRIEF DESCRIPTION

The present application provides systems and/or methods for determining the quality of a mass-fragment spectrum, where the quality is computed using an intensity balance of the spectrum.

DETAILED DESCRIPTION

The following discussion focuses on filters for assessing the quality of mass-fragment spectra prior to further processing, such as providing the spectra to an identification process. Filtering assists in ensuring reasonably good spectra are sent to time-consuming additional processing steps, such as database-search identification programs, (such as SEQUEST and Mascot, among others) or de novo sequencing programs (such as Lutefisk). The filters' algorithms can also be used to identify high-quality spectra that warrant even more time-consuming analysis, such as SEQUEST with a database of post-translational modifications, partial sequence identification using GutenTag. Also disclosed is an example of a successful de novo sequencing of spectra selected using a filtering algorithm, that could not be recognized by SEQUEST, a reversal of the usual situation in which database-search methods outperform de novo methods.

Various filters described below have been shown to remove approximately 75% or more of the bad spectra while losing approximately 10% of the high-quality (identifiable) spectra. Interestingly, the number of peaks and their intensities—often used by experts to 'eyeball' spectra—had little classification power relative to more detailed features such as the number of peak pairs differing by amino acid masses. Thus, it is shown that quality assessments are more easily achieved by a machine than by human expert observation.

While much of the following description uses terminology for proteins and peptides, one skilled in the art will understand that the disclosed techniques can be used with any polymer.

It was also determined that a loss of 10% of the peptide identifications incurs a smaller loss in the number of protein identifications. In a large-scale study of the *Chlamydia* proteome, a filter of the type disclosed in this patent—applied in series after a filter based on the previous art—lost only 5% of the correct peptides and 3% of the correct protein identifications. It removed an additional 44% of the bad spectra beyond those removed by the simple filter, thus improving computer throughput by almost a factor of two, and—surprisingly—reduced the number of incorrect (non-*Chlamydia*) peptide and protein identifications (by 8% and 12%, respectively) when searching against a large, multi-species "distractor" database.

Thus, in one aspect of the present exemplary embodiments, described is a computer-controlled filtering method which provides for the steps of accessing a mass-fragment spectrum or portion of such a spectrum. A data structure (such as an array) is then constructed that is responsive to a peak difference of the spectrum, and a spectrum is selected responsive to the constructed data structure.

Figure 1:
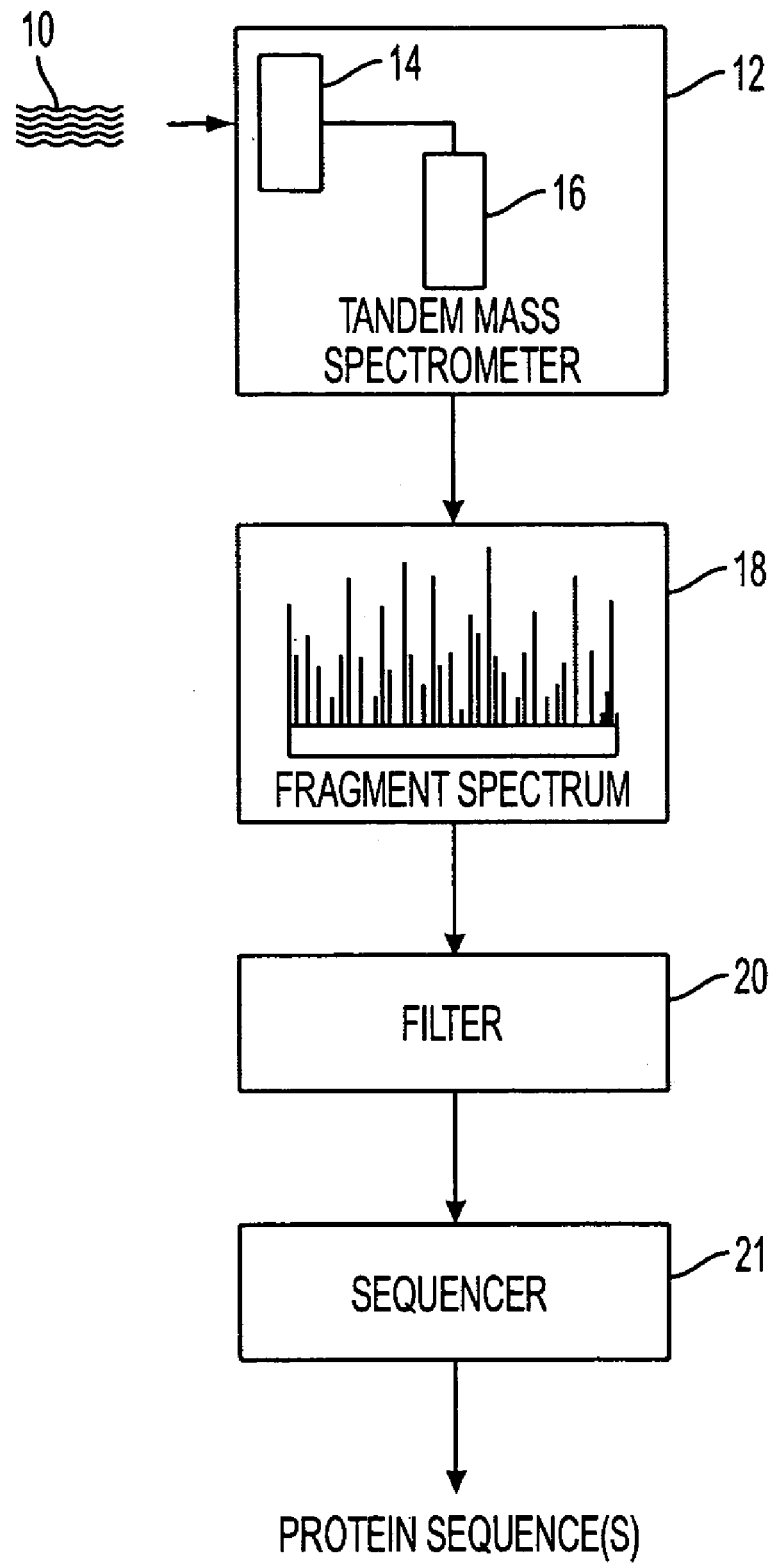
FIG. 1 is a block diagram of a process for correlating tandem mass spectrometer data with sequences from a protein sequence library.

Another exemplary embodiment is directed to a computer controlled filtering method which provides for the accessing of a portion of a mass-fragment spectrum. Then a feature vector responsive to the intensity balance of the spectrum is constructed, and a spectrum is selected responsive to the constructed array. FIG. 1 is a block diagram of a process for correlating tandem mass spectrometer data with sequences from a protein sequence library. It is to be appreciated that FIG. 1 show but one example of where the filter can be used. The filter can also be used for other applications such as statistical analysis that needs to use quality spectra, as well as future applications that are now enabled by the invention. The process incorporates a filter to perform a filtering operation prior to comparison between the spectra and a sequence library. In this example, the material input for analysis is of an unknown peptide sample 10, but may be other samples, including but not limited to polysaccharide, lipid, or polynucleotide. Typically the peptide will be output from a chromatography column which has been used to separate a partially fractionated protein. The protein can be fractionated by, for example, gel filtration chromatography and/or high performance liquid chromatography (HPLC). The sample 10 is introduced to a tandem mass spectrometer 12 through an ionization method such as electrospray ionization (ES). In the first mass spectrometer 14, a peptide ion is selected, so that a targeted component of a specific mass is separated from the rest of the sample 10. The targeted component is then activated or decomposed. In the case of a peptide, the result will be a mixture of the ionized parent peptide ("precursor ion") and component peptides of lower mass which are ionized to various states. A number of activation methods can be used, including collision induced dissolution (CID), electron capture dissociation, matrix-assisted laser desorption/ionization dissociation, etc.

The parent peptide and its fragments are then provided to the second mass spectrometer 16, which outputs an intensity and mass-to-charge ratio (m/z) for each of the plurality of fragments in the fragment mixture. This information can be output as a fragment mass spectrum 18, where each fragment is represented as a histogram whose abscissa value indicates the mass-to-charge ratio (m/z) and whose ordinate value represents intensity. The spectra are supplied to a filter 20, which may be one of a variety designed in accordance with exemplary embodiments of the present application. Filter 20 analyzes and classifies the spectra, and spectra determined to be acceptable are passed to a sequencer 21. The sequencer 21 (e.g., a database sequencer or a de novo sequencer) can generate one or more protein sequences for the molecule. In many instances, the protein sequences can be verified. For example, with a database sequencer, the protein sequences can compared to sequences from a protein sequence library.

In developing the to-be-described filters, 68,978 tandem mass spectra were obtained from a known mixture of five proteins (rabbit phosphorylase a, horse cytochrome c, horse apomyoglobin, bovine serum albumin and bovine β-casein), digested with four different proteases (trypsin, elastase, subtilisin and proteinase K). Of the 68,978 spectra, 5,678 were labeled "Good," meaning that they were matched by SEQUEST searching against the National Center for Biotechnology Information (NCBI) non-redundant protein database with 907,654 entries, to one of the five proteins in the mixture or to a likely contaminant such as keratin or one of the enzymes used for digestion. For the purposes of this description, the other 63,300 spectra were labeled "Bad," although some of these were high-quality spectra of variant or modified peptides. Such a large proportion of "Bad" spectra is typical of HPLC, in which eluted peptides are electrosprayed continually into a mass spectrometer. One MS instrument that may be used for the spectra investigation is an ion-trap instrument with a lower m/z (mass over charge) cut-off ~200–300 Da, and a resolution of ~0.3 Da at m/z ~1000, although other MS devices may be used in connection with the present concepts. Here and elsewhere Da may informally be written instead of Daltons per unit charge. A specific MS having these attributes is a Finnigan LCQ-Deca, manufactured by the Thermo Electron Corporation.

I. Intensity Normalization

Prior to describing the construction and operation of filters in more detail, attention is directed to an issue common to all MS/MS analysis processes, which is the intensity of the peaks developed in the spectra. Intensity of peaks is widely recognized as highly variable from spectrum to spectrum (Havilio et al., 2003). Consequently there is no previously agreed-upon procedure to normalize intensity information for use, for example, in algorithms used for comparisons with sequence databases. For example, it has been reported by Eng, J. K. et al. ("An Approach to Correlate Tandem Mass Spectral Data of Peptides With Amino Acid Sequences in a Protein Database." *J. Am. Soc. Mass Spectrom.*, 5, 976–989 (1994)), that SEQUEST uses only the largest 200 peaks and scores only the presence/absence of peaks, using two different constants for b- and y-ions. On the other hand, others (Havilio, M. et al., "Intensity-Based Statistical Scorer for Tandem Mass Spectrometry", *Anal. Chem.*, 75, 435–444 (2003), hereby incorporated in its entirety) have developed an intensity-based scoring algorithm and claim significant improvement over SEQUEST. However, intensity based scoring presents its own set of challenges. Raw intensities are too variable to be used, with maximum and total intensities varying over two or three orders of magnitude within "Good" data groupings. Relative intensities (i.e., raw intensities divided by total intensity) as used by Havilio et al., are better, yet are still highly variable, because a single strong peak or a low background of noise peaks often shifts values by a factor of two or three.

Figure 2:
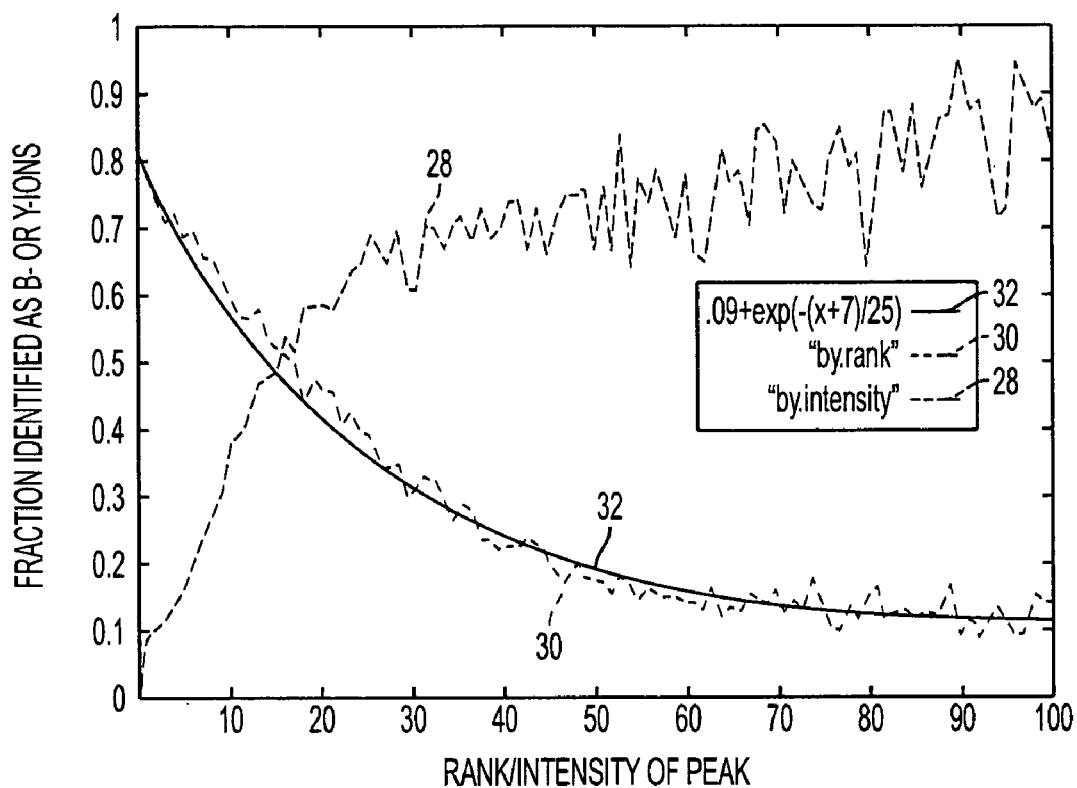
FIG. 2 illustrates rank and relative intensity correlation with an a posteriori measure of peak quality.

The inventors, therefore, have minimized intensity variations by implementing a procedure which ranks intensities of spectrum peaks. Following generation of these rankings, testing was undertaken between relative intensity and rank-based intensity. Results are illustrated in FIG. 2. The bumpy increasing curve 28 identifies the probability that a peak of a given relative intensity turns out to be a b- or y-ion. For this line the x-axis is in hundredths of percentage, that is, 50 means 0.5% of the total ion intensity is in this peak. The bin size was picked to supply a curve that runs over roughly the same 0.1–0.8 range as the rank curve 30. The y-axis shows (#b+#y)/(#b+#y+#?), where #b is the number of b-ion peaks of a given intensity (out of 1416 identified spectra), #y is the number of y-ion peaks and #? is the number of unidentified peaks. Other identified peaks (isotopes, a-ions, water or ammonia losses, internal fragments) were not counted in the probability. The less bumpy decreasing rank curve 30 identifies the probability that a peak of a given rank (rank 1=most intense) turns out to be a b- or y-ion. The smooth curve 32 is an exponential function shown for comparison. The fact that rank-based intensity normalization (i.e., rank curve 30) gives a less bumpy curve than relative intensity (i.e., relative intensity curve 28) argues for improved (lower variance) probability estimation from use of rank-based intensity normalization.

FIG. 2 illustrates how well rank and relative intensities correlate with an a posteriori measure of peak quality, computed on the "Good" spectra in a training set, i.e., the probability that the peak is a b- or y-ion. Each spectrum has peaks of all ranks (at least up to about rank 200) but spectra differ considerably in relative intensities, and hence estimation of probability from rank has much lower variance than estimation from relative intensity. This advantage of rank over intensity extends to probability-based scores and features.

Moreover, FIG. 2 justifies a particularly simple way to use ranks. As mentioned, the plot of rank versus probability fits a negative exponential function quite well. Thus the contribution of peak x to a probabilistic scoring function as advocated in the literature is considered to be proportional to a constant plus 1/Rank(x), in order that a sum of contributions is equal to a constant plus the log-likelihood that the peaks in the sum are b- and y-ions. Thus, for maximum robustness, rank-based intensity normalization was selected for use in generating of the filters rather than relative intensities, where the most intense peak has a rank=1, the second most intense has rank=2, and so forth.

Figure 3:
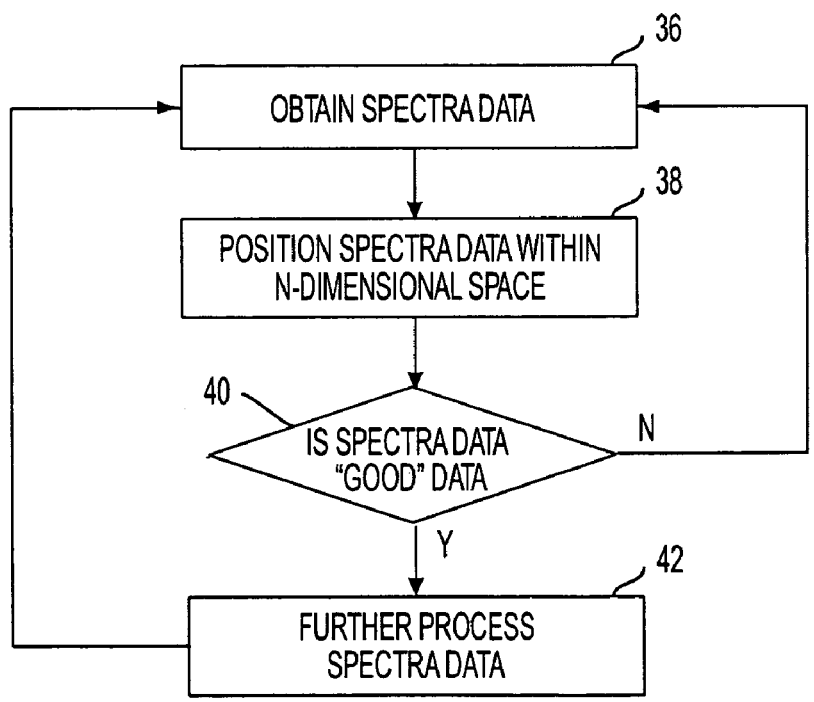
FIG. 3 depicts a top-level flow diagram for a filtering operation in accordance with the present application.

FIG. 3 depicts a top-level flow diagram for a filtering operation in accordance with the present application. As described in detail below, this flow diagram can be utilized to distinguish "Good" input spectra from "Bad" input spectra data in connection with spectra identifying techniques. In general, input spectra deemed "Good" refers to spectra that correspond to polymers of interest, and input spectra deemed "Bad" refers to spectra that do not. It is to be appreciated that the following is provided for explanatory purposes and is not limitative.

In step 36, input spectra data is obtained. In one instance, the input spectra data includes proteins that have been digested into smaller pieces, such as various length peptides. The smaller pieces can be provided to a tandem mass spectrometer (MS/MS), which generates a spectrum for the respective pieces. In other aspects, the input spectra data can be associated with other entities that can be represented through spectra. In addition, the input spectra data can be provided at step 36 in discrete samples and/or as a stream. In step 38, the input spectra data is positioned in an n-dimensional space. As described herein, a variously shaped decision surface can be generated for the n-dimensional space through training, for example, through one or more training sets with known "Good" and "Bad" data. Such training can be performed prior to receiving the input spectra data at step 38. In another aspect, the surface can be generated, saved (e.g., as a file), and retrieved when needed. In step 40, a determination is made as to whether the input spectra data is "Good" or "Bad" data as a function of its position within the n-dimensional space with respect to the above noted surface. For instance, input spectra data can be labeled as "Good" data when it resides in the "Good" (or "OK") area of the n-dimensional space, and the input spectra data can be labeled as "Bad" data when it does not reside in the "Good" area of the n-dimensional space. In step 42, input spectra data deemed "Good" can be further processed, such as a comparison/identification of the spectra for a sequence database as described in connection with FIG. 1 (for example by SEQUEST). Input spectra data deemed "Bad" can be ignored, discarded, deleted, etc. As depicted in FIG. 3, these steps can be repeated for subsequent samples and/or streams of input spectra data.

Figure 4:
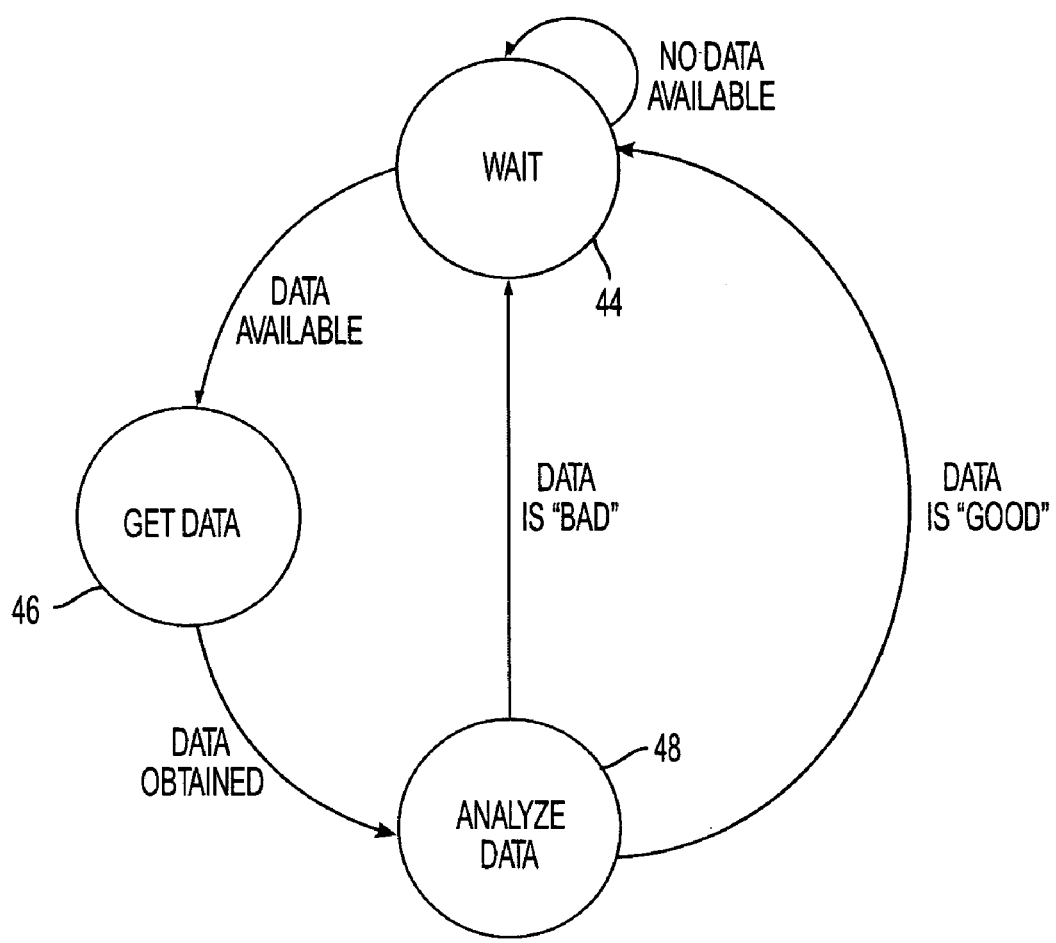
FIG. 4 depicts exemplary states associated with a filtering operation in accordance with the present application.

It is to be appreciated that the steps described in FIG. 3 can additionally or alternatively be depicted as a state machine, as illustrated in connection with FIG. 4. A state 44 represents a wait state. In the state 44, the state machine can poll (e.g., at a predetermined interval) to determine if input spectra data is available and/or it can sit idle until notified, for example, through an event, an interrupt and the like. When input spectra data becomes available, the state machine can transition to a state 46, where the input spectra data is obtained, for example, through reading the input spectra data. It is to be appreciated that the input spectra data can be read as blocks (e.g., 8 bytes at a time), where one or more of the blocks can be analyzed concurrently and/or serially. When a suitable portion (e.g., a block, two blocks, an entire stream . . . ) of the input spectra data is obtained, the state machine transitions to a state 48, where the input spectra data is analyzed to determine whether it is "Good" data (e.g., located in the "Good" area of n-dimensional space) or "Bad" data (e.g., not located in the "Good" area of the n-dimensional space). If the input spectra data is determined to be "Bad" data, the state machine transitions back to the wait state 44, where the state machine waits for the next available input spectra data. If the input spectra data is determined to be "Good" data, the "Good" data is stored (e.g., for later processing) or analyzed, such as for comparison/identification of the spectra for a sequence database as described in connection with FIG. 1. The state machine transitions back to the wait state 44, where the state machine waits for the next available input spectra data. It is to be appreciated that in some embodiments a goodness/badness result value is generated. This value can provide an indication of the goodness or badness of the sample.

Figure 5:
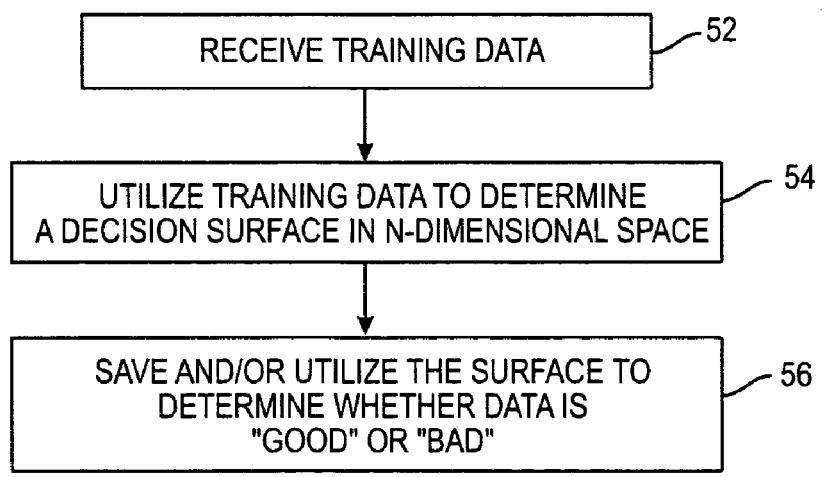
FIG. 5 illustrates a top-level flow diagram depicting an exemplary training technique.

As noted above in connection with FIG. 3, the surface utilized to determine whether input spectra data is "Good" or "Bad" can be generated through training. FIG. 5 illustrates a top-level flow diagram depicting an exemplary training approach. In step 52, training data is provided. The training data may be any appropriate data which can be acted upon by the filter. For instance, the training data can include one or more sets of "Good" and "Bad" data. In step 54 the training data is used to develop a surface in the n-dimensional (or multidimensional) space. In step 56, the surface can be saved and subsequently employed to facilitate determining whether input spectra data is "Good" or "Bad" in order to mitigate utilizing the "Bad" data during spectra database searches to improve throughput and robustness when matching spectra. Alternatively, the surface can be generated, utilized and discarded.

The following provides exemplary pseudo code that can be utilized to implement one or more of the steps described in connection with one or more of the FIGS. 3–5. It is to be understood that the example pseudo code is provided for explanatory purposes. In addition, one skilled in the art would recognize that essentially any programming language or programming methodology can be utilized to implement these steps. In addition, these steps can be implemented by custom electronics.

---
Pseudo Code Listing 1
---

```
Main {
    global multidimensional_space surface [ ];
    spectrum_buffer[ ];
    surface=train(training_samples);
    while true {
        spectrum_buffer = read (input_spectrum);
        if (spectrum_OK(spectrum_buffer, surface)) write
            (spectrum_buffer);
    }
}
```

Furthermore, it is to be understood that the pseudo code provided above and other pseudo code listed herein illustrate embodiments by which filtering operations according to the present application may be designed by one of ordinary skill in the art. It is, however, to be appreciated that the pseudo code listings herein are not intended to represent executable code.

While Pseudo Code Listing 1 shows the filter selecting some spectra from the stream of spectra while discarding other spectra, one skilled in the art will understand that another embodiment could rate the quality of each spectrum (instead of filtering the spectra) and associate the quality rating with each spectrum. Subsequent processing of the spectrum could consider the quality rating along with other spectral characteristics.

With particular attention to the above pseudo code listing 1, an optional function "train" can receive inputs and generate a surface within an n-dimensional space. This function is optional in that a previously generated surface can be read from storage (e.g., memory, disk, CD . . . ) instead of being created here. For instance, the filter can be initially trained and the surface saved to storage (e.g., a file), such that in subsequent invocations of the filter, the surface is input by the filter from the previously saved file. The pseudo code can include an additional statement (not shown) that checks to determine whether a suitable surface already exists. Either the existing surface or a newly generated surface can be used. In another example, a flag that indicates whether the train function should be called can be passed in as an argument or through a constructer (for example, in an object oriented programming methodology). Once the surface has been obtained or determined (i.e., the filter has been trained), the filter reads input spectrum data and determines whether the input spectrum (in the spectrum buffer) is in the "Good" region of the n-dimensional space as a function of the surface. Thereafter, if it is determined the spectrum being tested is "Good" (i.e., "OK"), the spectrum data is written (or passed on) such that this information can be used in further identification operations. Training data is previously analyzed spectra that have been given a classification of good or bad. In some embodiments, the training data can include a measure of "goodness" or "badness" generated by the spectrum analysis program.

The foregoing description related to FIG. 2 and the pseudo code have been primarily directed to the concept of what may be considered a binary filter. Specifically, a surface is located in the n-dimensional space, and spectra represented by points on the "Good" side of the surface are passed for further processing, whereas spectra representing points on the "Bad" side are discarded, ignored, flagged as bad, etc. It is to be appreciated that FIG. 2 and pseudo code listing 1 are also applicable in a statistical regression method used to generate a continuous quality metric.

When using the regression method, the training data has a continuous quality score on each training data spectrum. From this training data, the method produces a regression function that given a new spectrum will assign it a quality score consistent with the training data.

In this embodiment, points in the n-dimensional space are assigned a numerical value representing the "quality" of the spectra represented by the point. For example, a point may be assigned a value in this embodiment with a number that represents the point's quality with respect to the training data.

Irrespective of whether the filter is of the binary or continuous quality metric type, there are, broadly speaking, two approaches to developing these filters. A first approach devises a number of custom features incorporating expert knowledge, whereas an alternative approach supplies less processed, high-dimensional data into a learning model or classifier algorithm, such as, but not limited to, Support Vector Machines (SVM), Support Vector Regression (SVR), and Neural Networks (NN), which can learn from the training data.

II. Classification Using Custom Features

Attention will now be directed to the use of custom features as inputs to the filter, and which use a normalized intensity of the form:

$$\text{Norm}/(x) = \max\{0, C_1 - (C_2/\text{Max}mZ) \cdot \text{Rank}(x)\},$$

where MaxmZ is the maximum significant m/z-value in the spectrum, and $C_1$ and $C_2$ are constants. The MaxmZ term means that generally more peaks are considered for longer peptides.

The values for $C_1$ and $C_2$ for each feature were learned separately, by picking the $C_1$ and $C_2$ values that gave the best discrimination between "Good" and "Bad" in the training set. For example, $C_1=28$ and $C_2=400$ for the Good-Diff Fraction feature, meaning that Norm/(x) is greater than zero if Rank(x)≦140 when MaxmZ=2000, a typical value. Generally in the building of the filters, $C_1$ and $C_2$ were about the same for different features, with the exception of a to-be-described Isotopes feature which used peaks of much lower rank. It appears the fact that a peak has appropriate m/z and intensity relative to another peak increases the likelihood that the peak is meaningful. This is only one example of how to incorporate rank into a quality filter.

Each spectrum may be mapped to a feature data structure. Examples of suitable data structures include n-dimensional arrays, vectors, and data records. One skilled in the art will understand that references to arrays are but one of many possible ways of structuring data that can be used by the embodiments disclosed herein. The inventors intend the terms "vector" and "array" to represent any representation of data that can be used by equivalent embodiments to perform the filtering function including associating separate variables in programmed procedure or function invocations. One skilled in the art will understand that embodiments can be implemented using any known programming methodology from procedural programming to object-oriented programming or any other programming methodology.

The following describes a 7-dimensional data structure $(f_1, f_2, \ldots, f_7)$, a point in a 7-dimensional space $(R^7)$, where $f_i$ is the value of the i-th feature below. It is to be appreciated that the following may be implemented in dimensional spaces which are less than or greater than a 7-dimensional space, and that other features may be developed in accordance with the concepts of the present application for use in dimensional spaces greater than or less than the 7-dimensional space represented by the seven features described below. The features presented herein, include feature 1 ($f_1$), Npeaks; feature 2 ($f_2$) Total Intensity; feature 3 ($f_3$), Good-Diff Fraction; feature 4 ($f_4$) Isotopes; feature 5 ($f_5$) Complements; feature 6 ($f_6$) Water Losses; and feature 7 ($f_7$), Intensity Balance, which are defined below as:

(1) Npeaks. The number of peaks in the spectrum. This feature is often used for human assessment of spectrum quality.

(2) Total Intensity. The sum of the raw intensities of the peaks in the spectrum.

(3) Good-Diff Fraction. This feature measures how likely two peaks are to differ by the mass of an amino acid. Let $\text{GoodDiffs}=\Sigma\{\text{Norm}/(x)+\text{Norm}/(y):M(x)-M(y)\approx M_i\}$ for some i=1, 2, . . . , 20, where M(x) is the m/z-value of peak x and $M_1, M_2, \ldots, M_{20}$ are the amino acid masses (not all of which are unique). The comparison implied by ≈uses a tolerance, which was set to 0.37 Da for a subject ion-trap spectra. Now let, $\text{TotalDiffs}=\Sigma\{\text{Norm}/(x)+\text{Norm}/(y):56 \leq M(x) - M(y) \leq 187\}$ Then $f_3$=GoodDiffs/TotalDiffs.

(4) Isotopes. The total normalized intensity of peaks with associated isotope peaks. That is, $\Sigma\{\text{Norm}/(x):M(x)\approx M(y)+1 \text{ and } /(x)\approx\text{Expected Intensity of +1 Isotope}\}$ (5) Complements. The total normalized intensity of pairs of peaks with m/z-values summing to the mass of the parent ion. The feature is computed assuming both +2 and +3 charge states for the parent ion (i.e., two different $M_{Parent}$ masses) and the larger feature value is used; the same technique is used in the program 2-3 to determine charge state. This known technique is described in Sadygov, R. G., et al., "Code Developments to Improve the Efficiency of Automated MS/MS Spectra Interpretation," *J. Proteome Res.*, 1, 211–215 (2002), hereby fully incorporated by reference.

$\Sigma\{\text{Norm}/(x)+\text{Norm}/(y):M(x)+M(y)\approx M_{parent}\}$ (6) Water Losses. The total normalized intensity of pairs of peaks with m/z-values differing by 18 Da. (One skilled in the art will understand that differing by approximately 18 Da means differing by the mass of a water molecule and that the actual mass difference depends on the accuracy of the spectrometer).

$\Sigma\{\text{Norm}/(x)+\text{Norm}/(y):M(x)-M(y)\approx 18\}$ (7) Intensity Balance. The m/z range is divided into 10 equal-width bands between 300 Da and the largest observed m/z. The feature is the total raw intensity in the two bands with greatest intensity minus the total raw intensity in the seven bands with lowest intensity.

Features 1, 2 and 5 have been generally discussed in the art. However, using any of these features in combination with one or more of the novel features presented above, i.e., features 3, 4, 6 and 7, is considered novel as is exclusively using any of the novel features. Also, various features, including feature 3 (Good-Diff Fraction), feature 4 (Isotopes) and feature 6 (Water Losses) determine spectral quality of a spectrum by using a novel approach of obtaining differences between peaks. More particularly, one manner of generating peak pair differences which may be used in the classifier is shown by the following pseudo code and FIG. 6.

---

Pseudo Code Listing 2

---

```
spectra_OK(spectra_buffer) {
    peak_array[ ]   // array of peaks where each peak has a mass and intensity
    spectrum_buffer[ ];
    difference_array[masses];   // array of mass differences
    peak_array = convert_mass_intensity(spectrum_buffer);   // determine peaks and
                                                             // peak intensities
    for every relevant pair of peaks (p1, p2) in peak_array {
        n=get_mass_difference (p1, p2);
        n = round(n) // round n to an appropriate resolution
        difference_array(n) += intensity(p1, p2);
    }
    spectra_OK=analyze(peak_array, difference_array); // analyze spectrum
}
```

Figure 6:
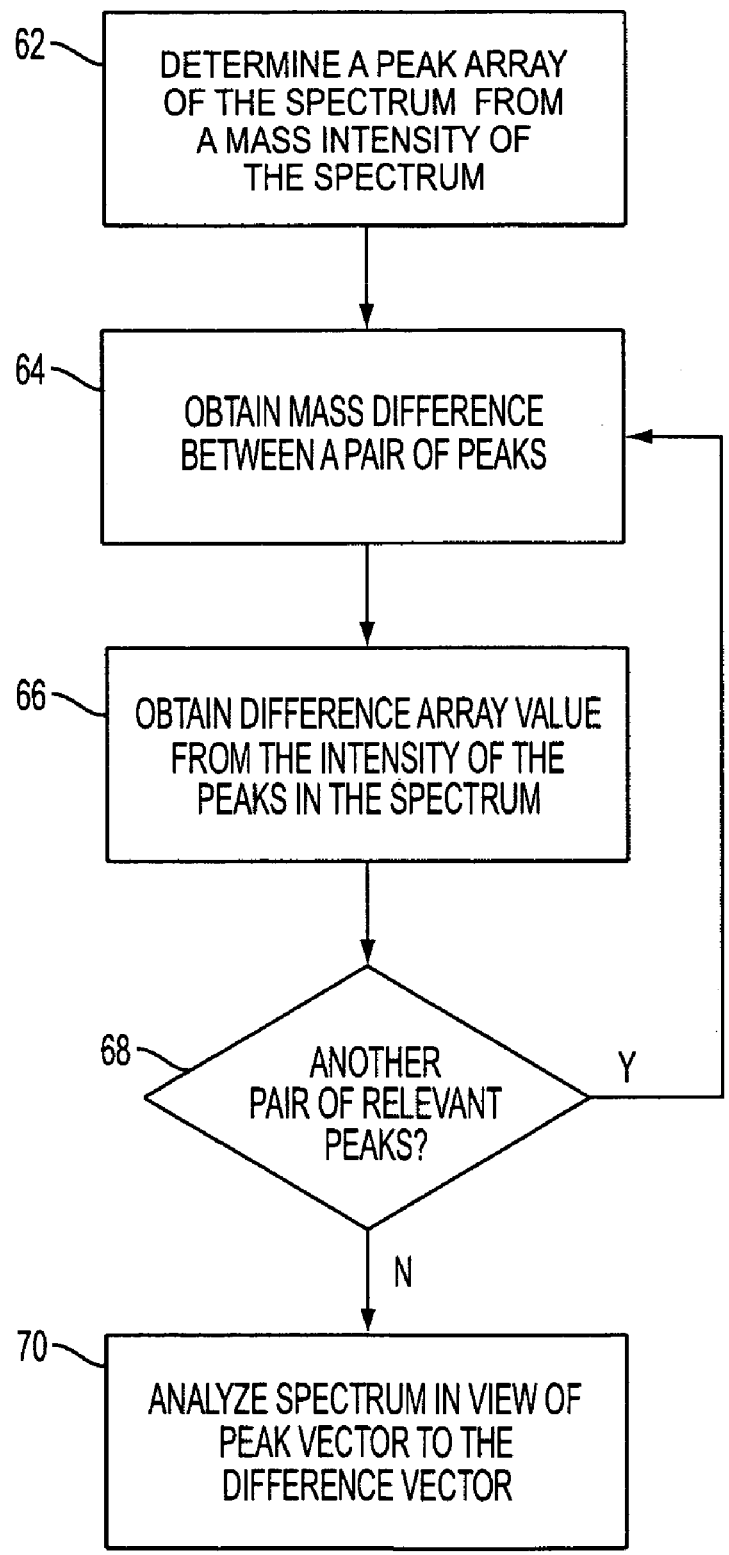
FIG. 6 illustrates a method for constructing an array that is responsive to a peak pair difference of a portion of a mass-fragment spectrum.

Pseudo code listing 2 and FIG. 6 constructs an array that is responsive to a peak pair difference of a portion of a mass-fragment spectrum. As illustrated in FIG. 6, in an initial step 62 the mass intensity of a spectrum is converted to determine a peak array of the spectrum. Thereafter, in step 64 the mass difference between a pair of peaks is obtained by finding the difference between two peaks p1 and p2 where the mass of peak p1<the mass of peak p2. Then, in step 66, a difference array value is obtained from the intensity of the peaks in the spectrum. In step 68, it is determined whether another pair of relevant peaks exists. If another pair exists, then the mass difference between this pair of peaks is obtained as described above in connection with step 64, and a difference vector value is obtained from the intensity of the peaks in the spectrum. When the mass difference is obtained for all possible pairs of peaks, in step 70, the spectrum is analyzed in view of the peak vector and difference vector created above. The results of this analysis may be used (e.g., with FIGS. 3–4) to determine whether a spectra is to be passed for further analysis as it is considered "Good" or removed as it is considered "Bad."

Figure 7:
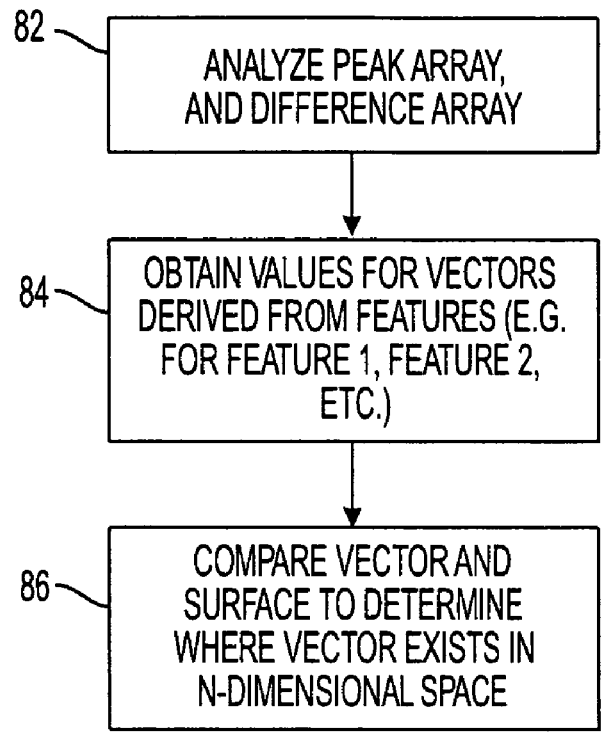
FIG. 7 is a block diagram that describes a process for generating values for custom features to determine where vectors are located in the n-dimensional space.

Turning to FIG. 7, set out is a block diagram which correlates to the following pseudo code, to describe a process for generating values for the previously described custom features to be analyzed, to determine where vectors generated in accordance with the custom features are located in the n-dimensional space.

Pseudo Code Listing 3

```
analyze(peak_array, difference_array) {
    double vector [ ];
    vector[1]=feature1(peak_array, difference_array);
    vector[2]=feature2(peak_array, difference_array);
    ...
    analyze=compare_v_s(vector, surface); // determine where vector
                                          // falls in the n-dimensional space
}
```

With attention also to FIG. 7, in step 82, a procedure is provided to analyze a peak array and difference array of the spectrum. In a step 84, values for a feature vector corresponding to respective features (e.g., features 1–7) are obtained. As can be seen in the pseudo code, two vector elements "vector[1]" and "vector[2]" are generated for first and second features, respectively. From the pseudo code it can be seen that an additional number of features can be generated and utilized to populate the vector's elements. Then in step 86, a comparison of the vector (or features) to the surface in the n-dimensional space is undertaken to analyze where those vectors will fall with respect to the surface defined by the training data in the n-dimensional space.

Figure 8:
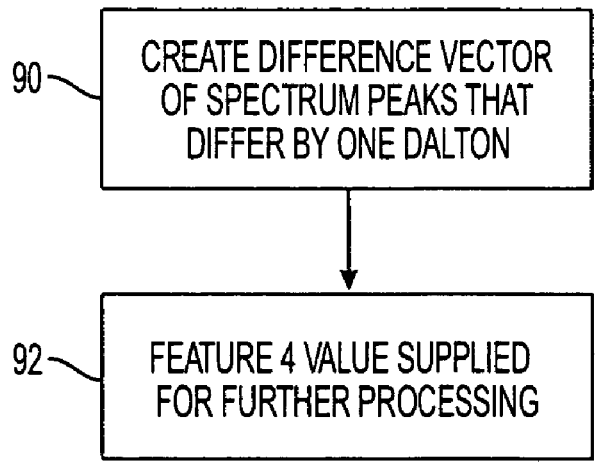
FIG. 8 illustrates a block diagram for generating an Isotope feature.

Turning now to examples of specific features being developed as vector elements for use by the filter, attention is directed to the following pseudo code listing and FIG. 8, which describes the generation of a "feature 4" (i.e., feature 4 (Isotope) from the discussion above).

Pseudo Code Listing 4

```
feature4(peak_array, difference_array) {
    feature4 = 0
    For all k near 1 {  // the spectra peaks that differ by one Dalton,
                        // up to an appropriate resolution
        feature4 = feature4 + difference_array[k];
    }
}
```

In step 90 a difference vector is created consisting of spectrum peaks that differ by only one Dalton (i.e., Isotopes feature). Then in step 92 the feature 4 value is supplied to the filter such as that of FIG. 7. For instance, the value of feature 4 can be utilized to populate a element in the vector (e.g., vector[4]). Thus, and as mentioned above, certain features being generated are based on peak differences between the peaks in a spectrum. It is to be appreciated, however, that the filter of the present application may be used in embodiments where the peak difference concept is not employed. Rather, features such as feature 5 above (i.e., Complements), where the feature is based on the summing of the mass of the parent ion may also be used.

Provided below is a description of a "feature 7" (e.g., feature 7 (Intensity Balance) that does not rely on difference pairs, as illustrated by the following pseudo code listing and the block diagram of FIG. 9.

Pseudo Code Listing 5

```
feature7 (peak_vector, difference_vector) {
    partitions [ ]   //stores limits of each band
    intensity[ ]    // stores intensity of each band
    partitions=partitionvector(peak_vector);  //divide peak_vector into
                                              bands by
                                              //m/z (the mass coord)
    for each band
        intensity[band] = determine_intensity(peak_vector,
            partions[band]);
    sort (intensity);
    feature7= sum( intensity of most intense bands)
              - sum(intensity of least intense bands);
}
```

Figure 9:
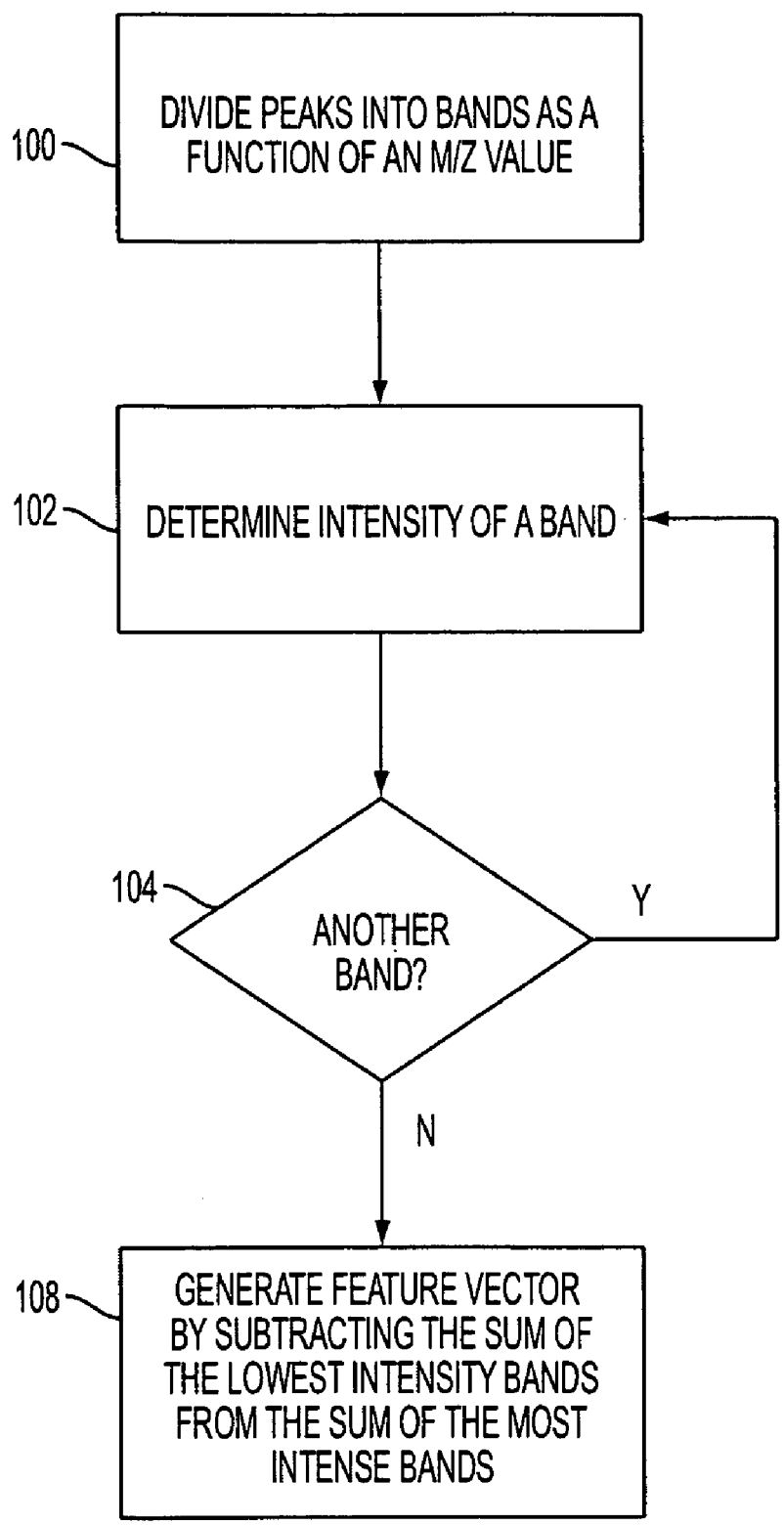
FIG. 9 illustrates a block diagram for generating an Intensity balance feature.

The above pseudo code listing 5 and FIG. 9 reflect the custom feature corresponding to that of feature 7 Intensity Balance. As shown more particularly in FIG. 9, in a first step 100, the peaks are divided into bands as a function of an m/z value. In a following step 102, the intensity of a peak portion for a band is determined. In step 104, it is determined whether the intensity of one or more other bands is needed. If so, the intensity of peak portions of the remaining bands are determined. When intensities are determined for all the bands, then in step 106 this information is used to generate a second feature vector (i.e., the Intensity Balance feature 7 above), which, in one embodiment, is the total raw intensity of the two bands with the greatest intensity minus the total raw intensity in the seven bands with the lowest intensity. Thereafter, "feature 7" is provided to the filter such as that of FIG. 7. For instance, the value of feature 7 can be utilized to populate a field in the vector "v" (e.g., v[7]).

For classification by the filter, the well-known Quadratic Discriminant Analysis (QDA) was used, which is a classical method that models feature vectors of each class by multivariate Gaussian distributions and, thus, determines quadratic decision boundaries between "Good" and "Bad." This simple method works well, especially with summation features such as those used here that have approximate Gaussian distributions due to the central limit theorem.

In an investigation by the inventors, two separate classifiers were trained using the above procedures, one for singly charged parent ions and one for multiply charged. Training a QDA classifier involves computing the means and covariance matrix for the features. Outlying feature vectors were removed (if the value of any feature fell in the top or bottom 1% for that feature) in order to make the fitting more robust. For feature selection, all subsets of the set of features were tested, and one was chosen that gave the best binary classification performance on the training set (one-fourth of "Good" and one-eighth of "Bad"). An Occam's razor was imposed, whereby a subset of features was preferred if its percentage of correct classifications (both "Good" and "Bad") was within 0.5% that of the superset. The threshold was adjusted on the decision surface (an isosurface for probability ratio) so that 90% of the "Good" spectra were classified as good. Of course this threshold can be adjusted depending upon specific requirements, e.g., using less aggressive filtering for one-dimensional high-performance liquid chromatography (HPLC). The binary classifier for the singly charged spectra used four features: Good-Diff Fraction, Complements, Water Losses and Balance.

The binary classifier for the multiply charged spectra used four slightly different features: Good-Diff Fraction, Isotopes, Water Losses and Balance. The results on the test set (¾ of "Good" and ⅞ of "Bad") for the above filter using custom features are given in Table 1 where, for example, 89.9% of the singly charged "Good" spectra were called good by this binary filter (classifier).

TABLE I

|  | Called Good | Called Bad | % Correct |
|---|---|---|---|
| +1 GOOD | 671 | 75 | 89.9% |
| +1 BAD | 5585 | 11475 | 67.3% |
| +2/+3 GOOD | 3166 | 348 | 90.1% |
| +2/+3 BAD | 11611 | 26684 | 69.7% |
| ALL GOOD | 3837 | 423 | 90.1% |
| ALL BAD | 17196 | 38159 | 68.9% |

Error rates on the test set were essentially identical to those on the training set. The classification problem for spectra from singly charged parent ions is slightly more difficult than for multiply charged parent ions, due to the generally poor fragmentation of singly charged parent ions.

A binary filter that uses only Npeaks (feature 1) and Total Intensity (feature 2)—the two features most often used by experts in quick manual assessment—gives much weaker results than the filters employing various ones of the newly presented features: only 54% rejection of Bad spectra when 90% of the "Good" spectra are classified good.

The compare_v_s function locates the vector or point in the n-dimensional space and, depending on which side of the surface the vector falls, returns a true/false value and thus supports the binary classification method. When using the regression method, one skilled in the art would understand that a different function would be invoked that would return a quality score after applying the regression function to the vector as is subsequently described with respect to the section on Regression (IV).

III. Classification with Learning Models Such as SVM

In consideration of the improvements achieved above by use of m/z differences between peaks (Good-Diff Fraction, Isotopes, etc.), a histogram of m/z differences was used as an input to a learning model (or classifier algorithm), such as an SVM, SVR, NN or other appropriate learning model. The following discussion focusses on an SVM based filter. For this SVM, a vector of length 187 (the maximum mass of an amino acid residue) was created with bins for m/z differences of [0.5, 1.5], [1.5, 2.5], and so forth up to [186.5, 187.5]. The entry in histogram bin i is defined as a sum over all peak pairs in the spectrum:

$$Hist(i)=\Sigma\{\min\{1/\text{Rank}(x), 1/\text{Rank}(y)\}:M(x)-M(y)\in[i-0.5, i+0.5]\}.$$

This expression differs from Good-Diff Fraction (feature 4) in using $\min\{1/\text{Rank}(x), 1/\text{Rank}(y)\}$ rather than $\text{Norm}/(x)+\text{Norm}/(y)$. The difference between the expressions $1/\text{Rank}(x)$ and $1/\text{Norm}/(x)$ are inconsequential here, as it is obtained simply by shifting everything by a linear transformation. There is a difference between the sum and the minimum; the minimum was selected as it provided a better SVM classification performance. Raw intensities were also tried instead of $1/\text{Rank}(x)$ in order to test whether intensity normalization is necessary for SVM input data; since it was considered the SVM might be able to learn a better normalization solution. It was, however, found that $1/\text{Rank}(x)$ normalization in fact useful in improving classification performance by 2–3%.

For the SVM filter, SVM-Light (see: Joachims, T. (1999) Making large-scale SVM learning practical. In B. Schölkopf, C. Burges, and A. Smola, (eds), Advances in Kernel Methods—Support Vector Learning. MIT Press, Cambridge, Mass.), incorporated herein by reference was used and trained on ¼ of the "Good" spectra and 1/32 of the "Bad" spectra. In this design, about 30% of the training vectors ended up as support vectors. To expedite the training, tests were performed on three-fourths of the "Good" data and only one-fourth of the "Bad." Radial basis functions were used, and experimented to find a good value (500) for gamma, the width parameter of the basis functions. The default penalty value for training set errors was used, and the relative costs of the two types of errors were adjusted in order to obtain 90% correct classification of the "Good" spectra.

Figure 10:
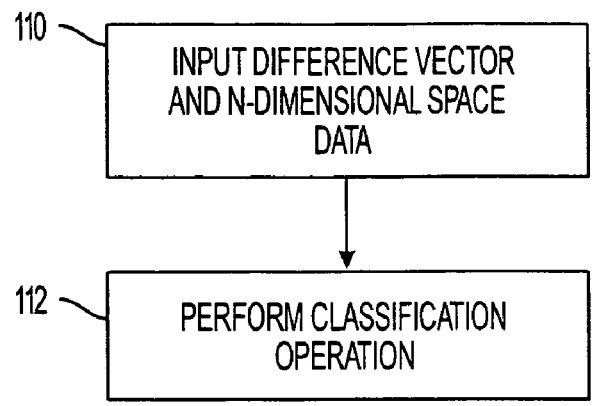
FIG. 10 illustrates a method that utilizes a modeling classifier to analyze difference array and n-dimensional surface information.

FIG. 10 and the below listed pseudo code listing illustrates procedures for an SVM filter (classifier) which permits the classification of different vectors.

Pseudo Code Listing 6

```
analyze(difference_vector) {
    analyze= svm_classify(difference_vector, surface);
}
```

With particular attention to FIG. 10, in using the modeling classifier, such as the SVM classifier, in a first step 110, the difference vector and n-dimensional surface information is input to the classifier, and then in step 112 the classifier is requested to analyze the input information.

TABLE II provides results obtained by operation of the SVM filter for operations with different Dalton ranges. Particularly, in addition to difference histograms with 1-Da bins from 1 to 187, larger difference histograms were also considered for inputs to the SVM: 1-Da bins from 1 to 384 and 0.5-Da bins from 1 to 187.

TABLE II

|  | Called Good | Called Bad | % Correct |
|---|---|---|---|
| 1-Da bins, 1 to 187 | | | |
| GOOD | 3833 | 427 | 90.0% |
| BAD | 4062 | 11738 | 74.3% |
| 1-Da bins, 1 to 374 | | | |
| GOOD | 3835 | 425 | 90.0% |
| BAD | 3894 | 11906 | 75.9% |
| 0.5-Da bins, 1 to 187 | | | |
| ALL GOOD | 3835 | 425 | 90.1% |
| ALL BAD | 3940 | 11860 | 75.1% |

Figure 11:
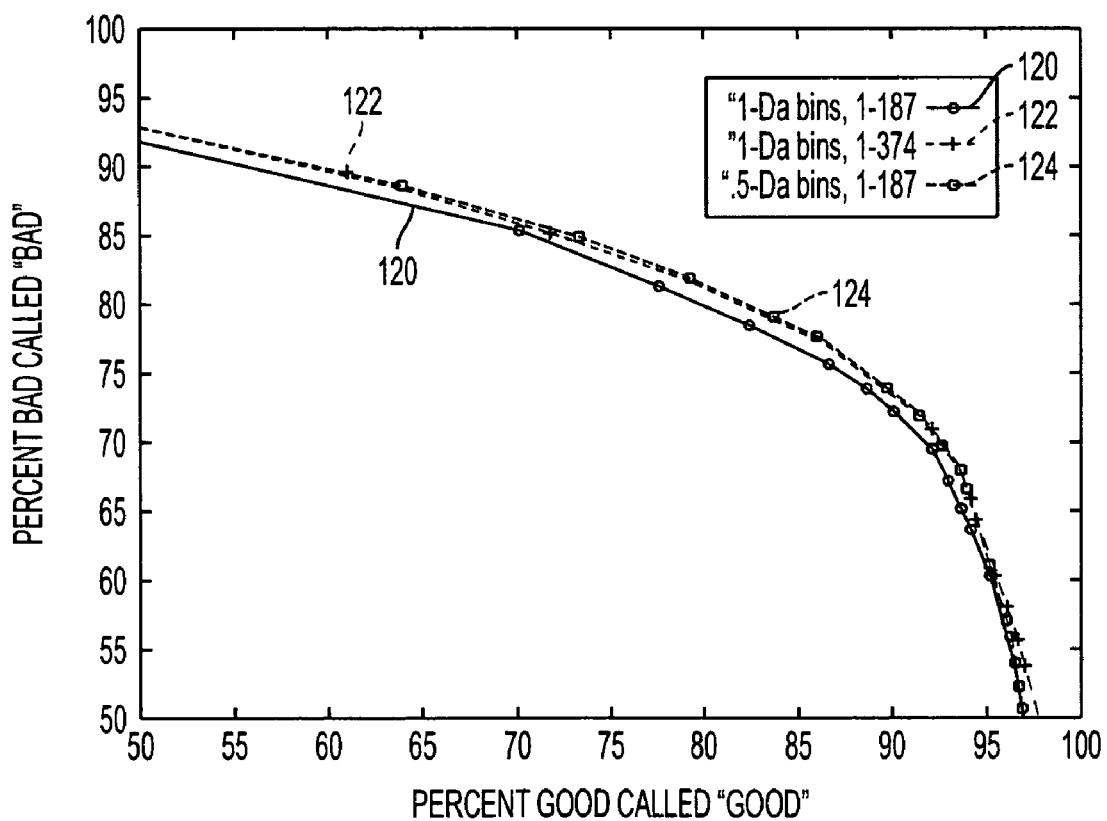
FIG. 11 provides Receiver Operator Characteristic (ROC) curves for that illustrate the trade off between false positives and false negatives for an SVM based filter.

FIG. 11 provides Receiver Operator Characteristic (ROC) curves for the SVM filter, which illustrate the trade off between false positives and false negatives. For example, if 15% loss of "Good" spectra is acceptable, then almost 80% of the "Bad" spectra can be removed, but if 5% loss of "Good" spectra is the maximum acceptable, then only about 60% of the "Bad" spectra can be removed. (Numbers do not exactly match Table II, because the width parameter gamma for the radial basis function kernel was changed in order to make more complete ROC curves.).

It was determined the SVM approach gives appreciably better results than the custom-feature approach, with performance improving slightly with increasing size of input vectors. The running time becomes slower as the size increases. In general, the SVM filters (classifiers) are slower than the QDA filters (classifiers), although not as slow as running SEQUEST itself. The fastest SVM filter (1-Da bins from 1 to 187) takes 362 s to process 20,000 spectra, whereas the QDA filter takes 114 s to process the same spectra. SEQUEST takes ~1 s per spectrum using a small (1 MB) database and ~15 s per spectrum on a large (100 MB) database.

IV. Regression

A binary classifier is sufficient for filtering spectra in order to improve SEQUEST throughput, but there is also interest in addressing the problem of assigning a numerical quality score to each spectrum, in order to prioritize the high-quality unidentified spectra for further processing. This is a regression problem, as it attempts to predict a continuous measure rather than a binary variable.

The continuous measure of quality was defined to be the fraction of b- and y-ions observed among the peaks of high intensity. More specifically, letting Length denote the number of amino acids in the peptide, Quality is defined as:

$$\text{Quality} = \frac{1}{2}(\#b + \#y)/(\text{Length}-1),$$

where #b is the number of b-ion peaks with rank<6 Length and #y is the number of y-ion peaks with rank<6 Length. This measure can be computed with an a posteriori analysis of the "Good" spectra. Other definitions of Quality were considered, e.g., an analogous definition using normalized intensity rather than simply presence/absence of peaks, and another definition that penalized for unidentified peaks. The various definitions of Quality gave similar results. The cited definition was selected because it is most interpretable by humans; the feature runs from 0 to 1.0, from no b- and y-ions observed to all possible b- and y-ions observed. In addition, many peptide identification programs, both database-search and de novo, rely on presence/absence of b- and y-ions rather than some sort of normalized intensity.

Next, a multivariate linear regression was performed with the seven custom classification features as explanatory variables and Quality as the response variable, in order to determine a linear combination of the features that is predictive of spectrum quality. The multivariate linear regression gave only two of the classification features (Good-Diff Fraction and Complements) highly significant non-zero coefficients as judged by P-values. The $R^2$ value for the regression was 0.537, which means that the linear combination has correlation coefficient $\sqrt{0.537} \approx 0.73$ with Quality.

The regression identified thousands of Bad spectra with predicted Quality scores better than the average Quality of "Good" spectra, which was ~0.28, meaning that only 28% of all possible b- and y-ions appeared among the best-ranking peaks in the spectrum. The six best "Bad" spectra (all with predicted Quality over 0.44) were submitted to Lutefisk, a de novo peptide sequencer. On two of the six spectra, Lutefisk gave partial sequences that could be uniquely matched by the BLAST matching algorithm to bovine serum albumin. TABLE III illustrates one of these successes; a bracketed number indicates a "mass gap", meaning unidentified residues, possibly with modifications, totaling that mass.

TABLE III

Top five Lutefisk identifications for the bestBAD spectrum

| Sequence | X-corr |
| --- | --- |
| [430.2]GSTWW[210.2]EMDKEACFA[154.1]AER | .809 |
| [430.2]GSTWW[210.2]EMDKEACFAVE[154.1]K | .789 |
| [430.2]GSDGDW[211.1]KMDKEACFAVE[154.1]K | .781 |
| [430.2]GSDGDW[211.1]KMDKEACAFVE[154.1]K | .756 |
| [168.1][262.1]GSTWW[210.2]EMDKEACFAVE[154.1]K | .800 |

A BLAST search with MDKEACFAVE gives a match with bovine serum albumin, which has a subsequence of ENFVAFVDKCCAADDKEACFAVEGPK. The letters GP perfectly fill the mass gap of 154.1 Da, so there is a high likelihood the identification even without knowing that bovine serum albumin was one of the proteins in the mixture. No suffix of the correct sequence ENFVAFVDKC-CAAD, however, sums to the same mass as [430.2]GSTWW [210.2]EM, which means that all the peaks in the spectrum are shifted from where they should be in an unmodified peptide from bovine serum albumin. (Indeed Lutefisk recognized DKEACFAVE on the basis of a ladder of y-ion peaks, with no help from b-ions.) Thus this spectrum is likely to be from a modified or variant peptide.

Figure 12:
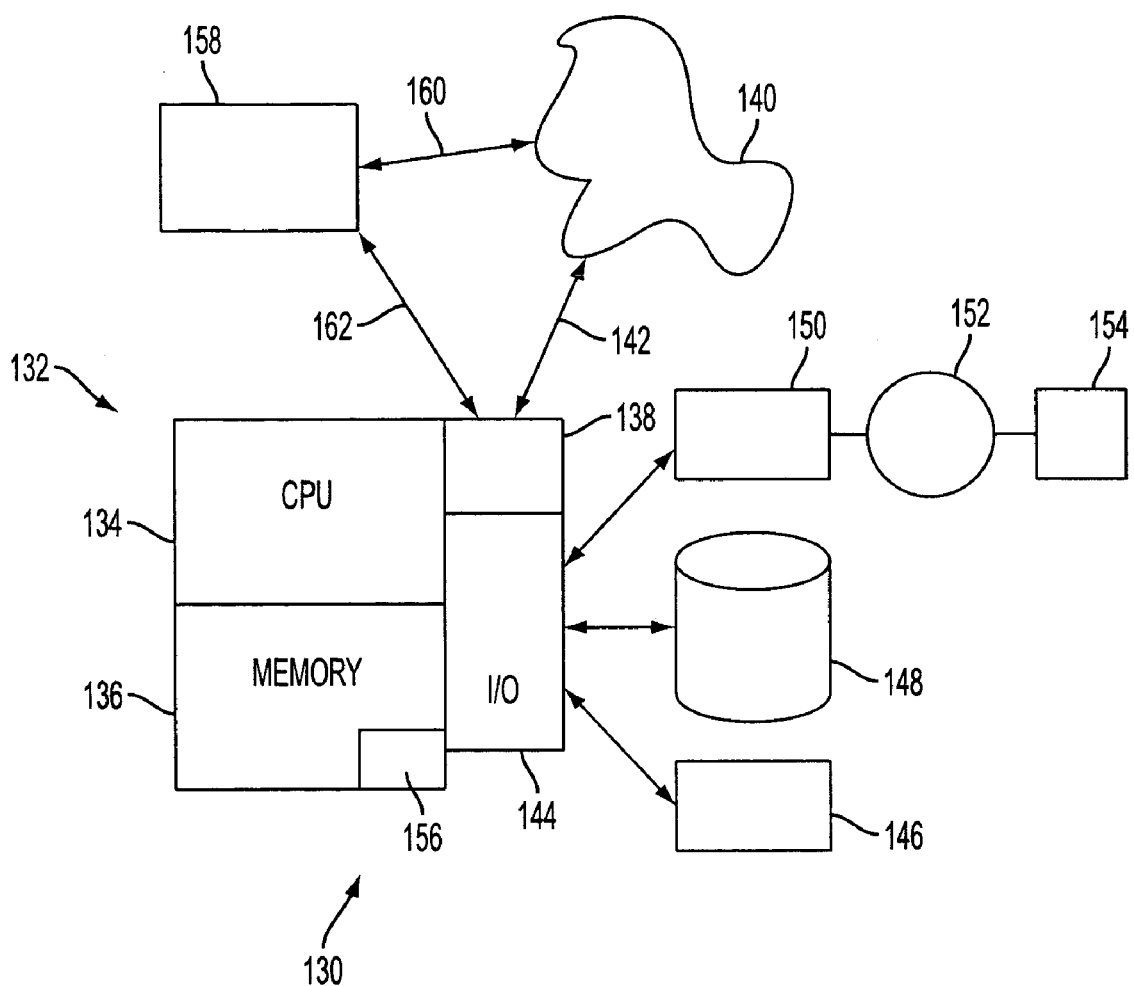
FIG. 12 illustrates a networked computer system in which the concepts described herein may be implemented.

It is to be appreciated that the discussed embodiment can be implemented via the use of computational systems such as computers or other microprocessor-based devices (as well as the use of custom electronics). FIG. 12 illustrates a computer system 130, in which the concepts described herein may be implemented. The computer system 130 includes a computer 132 that incorporates a CPU 134, a memory 136, and can include a network interface 138. The network interface 138 can provide the computer 132 with access to a network 140 over a network connection 142. The computer 132 also includes an I/O interface 144 that can be connected to a user interface device(s) 146, a storage system 148, a tandem mass spectrometer (not shown), and a removable-media data device 150. The removable-media data device 150 can read a computer readable media 152 that typically contains a program product 154. The storage system 148 (along with the removable-media data device 150) and the computer readable media 152 comprise a file storage mechanism.

The program product 154 on the computer readable media 152 is generally read into the memory 136 as a program 156 that instructs the CPU 134 to perform the processes described herein as well as other processes. The computer program 156 can be embodied in a computer-usable data carrier such as a ROM within the device, within replaceable ROM, in a computer-usable data carrier such as a memory stick, CD, floppy, DVD or any other tangible media. In addition, the program product 154, or updates to same, can be provided from devices accessed using the network 140 as computer instruction signals embodied in a transmission medium (with or without a carrier wave upon which the signals are modulated or other data transporting technology—including light, radio, and electronic signaling) through the network interface 138. One skilled in the art will understand that the network 140 is another computer-usable data carrier. In addition, one skilled in the art will understand that a device in communication with the computer 132 can also be connected to the network 140 through the network interface 138 using the computer 132. A mass spectrometer system, such as a MS/MS, 158 can be configured to communicate over the network 140 over a network connection 160. The system 158 can also communicate with the computer 132 over a preferred channel 162 through the network interface 138 or the I/O interface 144 (not shown). In addition, the spectra produced by the mass spectrometer can be processed by a separate computer that performs the method disclosed herein to filter the spectra data and feed the selected spectra data to an identification program.

Such filtering devices can also be included with, or attached to, a tandem mass spectrometer. Further, existing de novo or database-search identification programs can include the filter disclosed herein.

One skilled in the art will understand that not all of the displayed features of the networked computer system 130 nor the computer 132 need to be present for all embodiments in this application. Further, such a one will understand that the networked computer system 130 can be a networked appliance or device and need not include a general-purpose computer. The network connection 160, the network connection 142, and the preferred channel 162 can include both wired and wireless communication. In addition, such a one will understand that the user interface device(s) 146 can be virtual devices that instead of interfacing to the I/O interface 144, interface across the network interface 138.

In addition, one skilled in the art will understand that the network 140 transmits information (such as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network 140, like a tangible physical media, is a computer-usable data carrier Further, one skilled in the art will understand that a procedure can be a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps. Further, computer-controlled methods can be performed by a computer executing an appropriate program(s), by special purpose hardware designed to perform the steps of the method, or any combination thereof.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer controlled method comprising:
   accessing a portion of a mass-fragment spectrum;
   evaluating the portion of the mass-fragment spectrum responsive to an intensity balance of the portion of the mass-fragment spectrum; and
   processing the mass-fragment spectrum responsive to the step of evaluating.

2. The method of claim 1, wherein the step of processing further comprises rating the mass-fragment spectrum.

3. The method of claim 1, wherein the step of processing further comprises selecting the mass-fragment spectrum.

4. The method of claim 1, wherein the step of evaluating further comprises:
   constructing a vector responsive to the intensity balance of the mass-fragment spectrum; and
   locating the vector in a multidimensional space comprising a plurality of regions separated by at least one surface, the at least one surface determined by training data.

5. The method of claim 4, wherein the at least one surface is a quadratic surface.

6. The method of claim 1, wherein the step of evaluating further comprises:
   constructing a vector responsive to the intensity balance of the mass-fragment spectrum;
   determining one or more parameters of an evaluation function, the one or more parameters responsive to training data; and
   applying the parameterized evaluation function to the vector.

7. The method of claim 6, wherein the step of determining further comprises application of a support vector machine to the vector and the multidimensional space.

8. The method of claim 1, further comprising constructing a vector responsive to the intensity balance of the mass-fragment spectrum, and wherein the construction of the vector further includes making the vector responsive to a peak pair difference of the mass-fragment spectrum.

9. The method of claim 1, further comprising constructing a vector responsive to the intensity balance of the mass-fragment spectrum, and wherein the vector is responsive to a normalized intensity of pairs of peaks with m/z values differing by approximately 18 Da.

10. The method of claim 9, wherein the normalizing step includes using a rank-based intensity normalization scheme.

11. The method of claim 1, wherein the mass-fragment spectrum is of a sample containing a polymer.

12. The method of claim 11, wherein the polymer is selected from one or more of the group consisting of a peptide, a polysaccharide, a lipid and a polynucleotide.

13. The method of claim 1, wherein the mass-fragment spectrum includes at least one peak which represents a multiply charged ion.

14. A program product comprising:
   a computer-usable data carrier storing instructions that, when executed by a computer, cause said computer to perform a method comprising:
   accessing a portion of a mass-fragment spectrum;
   evaluating the portion of the mass-fragment spectrum responsive to an intensity balance of the portion of the mass-fragment spectrum; and
   processing the mass-fragment spectrum responsive to the step of evaluating.

15. The program product of claim 14 wherein the step of processing further comprises rating or selecting the mass-fragment spectrum.

16. The method of claim 14, wherein the step of evaluating further comprises:
constructing a vector responsive to the intensity balance of the mass-fragment spectrum; and
locating the vector in a multidimensional space comprising a plurality of regions separated by at least one surface, the at least one surface determined by training data.

17. The method of claim 14, wherein the step of evaluating further comprises:
constructing a vector responsive to the intensity balance of the mass-fragment spectrum;
determining one or more parameters of an evaluation function, the one or more parameters responsive to training data; and
applying the parameterized evaluation function to the vector.

18. An apparatus comprising:
a mass spectrometer that generates a mass-fragment spectrum; and
a computer that employs a filter that accesses at least a portion of the mass-fragment spectrum, constructs a vector that is responsive to an intensity-balance of the spectrum, and selects the spectrum responsive to the vector.

19. The apparatus of claim 18, further comprising a sequencer that determines at least one possible sequence of a plurality of molecular subunits that corresponds to the information in the mass-fragment spectrum.

20. A computer controlled method comprising:
accessing a portion of a mass-fragment spectrum;
evaluating the portion of the mass-fragment spectrum responsive to a peak pair difference; and
processing the mass-fragment spectrum responsive to the step of evaluating.

21. The method of claim 20, wherein the step of processing further comprises rating the mass-fragment spectrum.

22. The method of claim 20, wherein the step of processing further comprises selecting the mass-fragment spectrum.

23. The method of claim 20, wherein the step of evaluating further comprises
constructing a vector responsive to the peak pair difference; and
locating the vector in a multidimensional space comprising a plurality of regions separated by at least one surface, the at least one surface determined by training data.

24. The method of claim 23, wherein the at least one surface is a quadratic surface.

25. The method of claim 20, wherein the step of evaluating further comprises:
constructing a vector responsive to the peak pair difference;
determining one or more parameters of an evaluation function, the one or more parameters responsive to training data; and
applying the parameterized evaluation function to the vector.

26. The method of claim 25, wherein the evaluation function is a linear function of the vector.

27. The method of claim 25, wherein the evaluation function is a polynomial function of the vector.

28. The method of claim 20, wherein the step of determining further comprises
constructing a vector responsive to the peak pair difference; and
application of a support vector machine to the vector.

29. The method of claim 20, wherein the peak pair difference is a difference between a peak isotope pair.

30. The method of claim 20, wherein the step of evaluating is also responsive to an intensity balance of the mass-fragment spectrum.

31. The method of claim 20, wherein the peak pair difference is of a pair of peaks with m/z values differing by approximately 18 Da.

32. The method of claim 20, wherein the step of evaluating is also responsive to a normalized intensity of pairs of peaks, 33. The method of claim 32, wherein normalizing intensity peaks includes using a rank-based intensity normalization scheme.

34. The method of claim 20, wherein the mass-fragment spectrum is of a sample containing a polymer.

35. The method of claim 34, wherein the polymer is selected from one or more of the group consisting of a peptide, a polysaccha ride1 a lipid and a polynucleotide.

36. The method of claim 20, wherein the mass-fragment spectrum includes at least one peak which represents a multiply charged ion.

37. A program product comprising:
a computer-usable data carrier storing instructions that, when executed by a computer, cause said computer to perform a method comprising:
accessing a portion of a mass-fragment spectrum;
evaluating the portion of the mass-fragment spectrum responsive to a peak pair difference; and
processing the mass-fragment spectrum responsive to the step of evaluating.

38. The program product of claim 37 wherein the step of processing further comprises rating or selecting the mass-fragment spectrum.

39. The program product of claim 37, wherein the step of evaluating further comprises:
constructing a vector responsive to the peak pair difference; and
locating the vector in a multidimensional space comprising a plurality of regions separated by at least one surface, the at least one surface determined by training data.

40. An apparatus comprising:
a mass spectrometer that generates a mass-fragment spectrum; and
a filter that accesses at least a portion of the mass-fragment spectrum, constructs a vector that is responsive to a peak pair difference and selects the spectrum responsive to the vector.

41. The apparatus of claim 40, further comprising a sequencer that determines at least one possible sequence of a plurality of monomers that corresponds to the information in the mass-fragment spectrum.

* * * * *